(12) United States Patent
Zheng et al.

(10) Patent No.: US 11,281,709 B2
(45) Date of Patent: *Mar. 22, 2022

(54) SYSTEM AND METHOD FOR CONVERTING IMAGE DATA INTO A NATURAL LANGUAGE DESCRIPTION

(71) Applicant: Sony Interactive Entertainment Inc., Tokyo (JP)

(72) Inventors: Jian Zheng, San Mateo, CA (US); Ruxin Chen, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,299

(22) Filed: Jul. 28, 2020

(65) Prior Publication Data
US 2020/0372058 A1 Nov. 26, 2020

Related U.S. Application Data

(63) Continuation of application No. 16/206,439, filed on Nov. 30, 2018, now Pat. No. 10,726,062.

(51) Int. Cl.
*G06F 16/383* (2019.01)
*G06F 16/583* (2019.01)
*G06K 9/32* (2006.01)
*G06N 5/04* (2006.01)

(52) U.S. Cl.
CPC .......... *G06F 16/383* (2019.01); *G06F 16/583* (2019.01); *G06K 9/3241* (2013.01); *G06N 5/046* (2013.01)

(58) Field of Classification Search
CPC ..... G06F 16/383; G06F 16/583; G06N 5/046; G06K 9/3241
See application file for complete search history.

(56) References Cited

U.S. PATENT DOCUMENTS

| | | | |
|---|---|---|---|
| 10,198,671 B1 * | 2/2019 | Yang | G06T 7/11 |
| 2017/0200065 A1 | 7/2017 | Wang et al. | |
| 2018/0005082 A1 | 1/2018 | Bluche | |
| 2018/0121734 A1 | 5/2018 | Min et al. | |

OTHER PUBLICATIONS

C. Liu, J. Mao, F. Sha, A. L. Yuille, "Attention Correctness in Neural Image Captioning", AAAI, pp. 4176-4182, J017.

(Continued)

*Primary Examiner* — Christopher Wait
(74) *Attorney, Agent, or Firm* — John L. Rogitz

(57) ABSTRACT

For image captioning such as for computer game images or other images, bottom-up attention is combined with top-down attention to provide a multi-level residual attention-based image captioning model. A residual attention mechanism is first applied in the Faster R-CNN network to learn better feature representations for each region by taking spatial information into consideration. In the image captioning network, taking the extracted regional features as input, a second residual attention network is implemented to fuse the regional features attentionally for subsequent caption generation.

20 Claims, 10 Drawing Sheets

(56) References Cited

OTHER PUBLICATIONS

J. Johnson, A. Karpathy, L. Fei-Fei, "Densecap: Fully Convolutional Localization Networks for DenseCaptioning", Proceedings of the IEEE Conference on Computer Vision and Pattern Recognition, pp. 4565-4574, 2016.

J. Lu, C. Xiong, D. Parikh, R. Socher, "Knowing When to Look: Adaptive Attention via A Visual Sentinel for3 mage Captioning", Proceedings of the IEEE Conference on Computer Vision and Pattern Recognition (CVPR), vol. 6, p. 2, 2017.

L. Li, S. Tang, L. Deng, Y. Zhang, Q. Tian, "Image Caption with Global-Local Attention", AAAI, pp. 4133-4139, 2017.

M. Pedersoli, T. Lucas, C. Schmid, J. Verbeek. "Areas of Attention for Image Captioning", Ecole de technologie superieure, Montreal, Canada, 2016.

P. Anderson, X. He, C. Buehler, D. Teney, M. Johnson, S. Gould, and L. Zhang, "Bottom-Up and Top-Down Attention for Image Captioning and Visual Question Answering", CVPR, vol. 3, p. 6, 2018.

R. Krishna, Y. Zhu, O. Groth, J. Johnson, K. Hata, J. Kravitz, S. Chen, Y. Kalantidis, Li-Jia Li, D. A. Shamma, et al. "Visual Genome: Connecting Language and Vision Using Crowdsourced Dense Image Annotations", International Journal of Computer Vision, 123(1):32-73, 2017.

R. Luo, B. Price, S. Cohen, G. Shakhnarovich, "Discriminability objective for training descriptive captions", Proceedings of the IEEE Conference on Computer Vision and Pattern Recognition, pp. 6964-6974, 2018.

S. Ren, K. He, R. Girshick, J. Sun, "Faster R-CNN: Towards Real-Time Object Detection with Region Proposal Networks", Advances in Neural Information Processing Systems, pp. 91-99, 2015.

T.Y. Lin, M. Maire, S. Belongie, J. Hays, P. Perona, D. Ramanan, P. Dollar, C. L. Zitnick, et al.,"Microsoft COCO: Common Objects in Context", European conference on Computer Vision, pp. 740-755, Springer, 2014.

\* cited by examiner

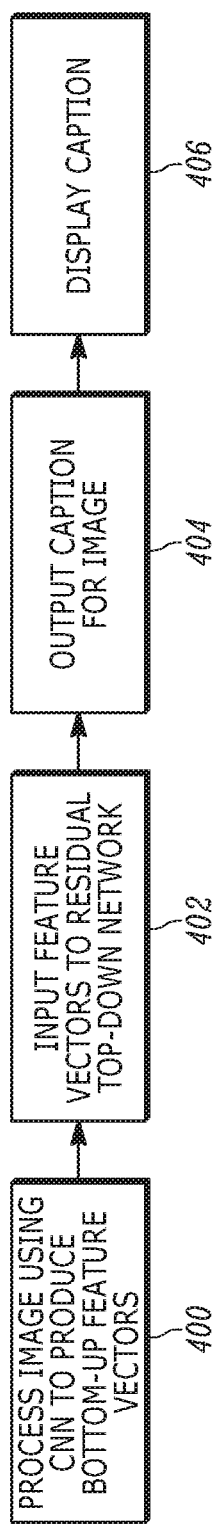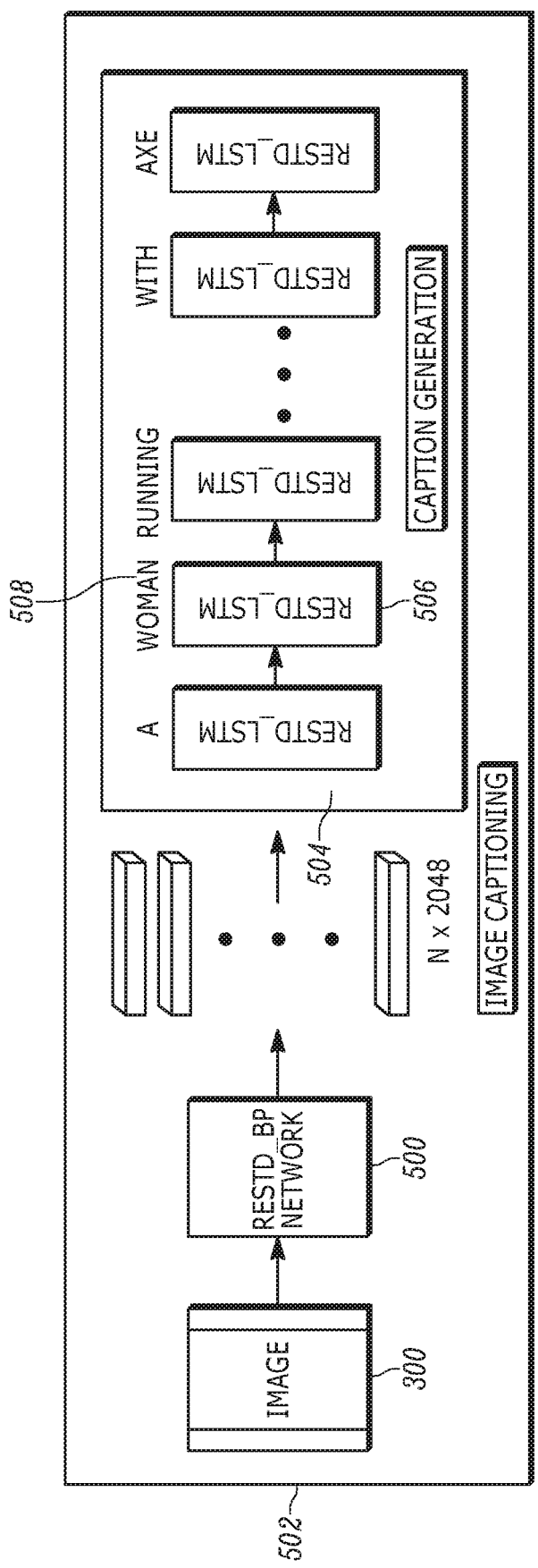

SYSTEM AND METHOD FOR CONVERTING IMAGE DATA INTO A NATURAL LANGUAGE DESCRIPTION

FIELD

The application relates generally to technically inventive, non-routine solutions that are necessarily rooted in computer technology and that produce concrete technical improvements.

BACKGROUND

Machine learning, sometimes referred to as deep learning, can be used for a variety of useful applications related to data understanding, detection, and/or classification including image classification, optical character recognition (OCR), object recognition, action recognition, speech recognition, and emotion recognition.

A particular application is generating captions to describe images, both subjects and objects in the images and what they are doing. Indeed, scene understanding is an important goal of today's computer vision. Human beings have the capability of comprehending visual scenes completely in a short time. The target of scene understanding is to enable the machine to see and understand the visual scenes as human beings. Image captioning requires the machine to automatically understand the given image and generate a natural language description. In this way, the description can be presented visually or aurally to aid people, both who may have perception problems and those who do not.

Image captioning has been a challenging problem due to the fact that to generate a reasonable description of a given image, a machine must capture the key visual aspects of the image which has a set of unstructured objects and express the scene with human understandable natural language. Gaming image captioning in particular is challenging because there are no available image caption datasets for games.

SUMMARY

An apparatus includes at least one processor and at least one computer storage that is not a transitory signal and that in turn includes instructions executable by the processor to receive an image, and process the image using a convolutional neural network (CNN) to generate feature maps. The instructions are executable to process at least a first feature map of the feature maps using a neural network (NN) to generate at least one attention vector representing at least one characteristic of the image. The instructions are further executable to combine the attention vector with the first feature map to render an output feature vector, combine the output feature vector with a pooled feature vector derived from the first feature map to render a final feature vector, and input the final feature vector to a caption generation network to generate a natural language caption for the image.

In example embodiments, the image is an image from a video game.

In non-limiting implementations, the NN is implemented by a multilayer perceptron (MLP).

In some embodiments, the instructions may be executable to combine the attention vector with the first feature map by executing a weighted sum over feature vectors in the first feature map with the attention vector to render the output feature vector. The instructions may be executable to combine the output feature vector with the pooled feature vector by executing an elementwise addition of the output feature vector with the pooled feature vector. In some implementations, the instructions are executable to combine the output feature vector with the pooled feature vector by concatenating the output feature vector with the pooled feature vector.

In another aspect, an apparatus includes at least one computer storage that is not a transitory signal and that in turn includes instructions executable by at least one processor to process an image using a feature generation module that includes at least one convolutional neural network (CNN) to output bottom-up feature information. The bottom-up feature information is input to a caption generation module that outputs a natural language caption describing the image. One or both of the modules can include at least one residual top-down network combining information from an attention vector with information from an average pooling vector derived from the feature information.

In example implementations of this aspect, the feature generation module includes a residual top-down network combining information from an attention vector with information from an average pooling vector derived from a source of feature vectors. In example implementations of this aspect, the caption generation module includes a residual top-down network combining information from an attention vector with information from an average pooling vector derived from feature vectors associated with the feature information.

In some embodiments, the residual top-down network of the feature generation module can include a neural network (NN) such as a multilayer perceptron (MLP) to process at least a first feature map from the CNN to generate at least one attention vector representing at least one characteristic of the image. The attention vector is combined with the first feature map to render an output feature vector that in turn is combined with a pooled feature vector derived from the first feature map to render a final feature vector for input thereof to the caption generation module.

The caption generation module, on the other hand, can include a first NN to process feature vectors from the feature generation module, a second NN to output a context vector, a third NN to receive the context vector output by a second NN to produce an output that is combined with an output of the first NN to render an input, and a fourth NN to process the input to render the attention vector. The attention vector from the fourth NN may be combined with context vector to render a combined vector that in turn is combined with the average pooling vector for input to a neural network such as a long short-term memory (LSTM) module producing natural language words from input.

In another aspect, an apparatus includes at least one computer storage that is not a transitory signal and that includes instructions executable by at least one processor to process feature vectors representing characteristics of an image using a first neural network (NN). The instructions are executable to process a context vector output by a second NN using a third NN, and to combine an output of the first NN with an output of the third NN to render an input. The instructions are further executable to process the input using a fourth NN to render an attention vector that is combined with the context vector to render a combined vector, with the combined vector being turn combined with a pooled vector derived from the feature vectors to render an attention vector. The instructions are executable to process the attention vector using a captioning NN to generate at least one word describing the image.

In non-limiting implementations of this last aspect, the prediction vector is processed using a long short-term memory (LSTM) neural network, and one or more the NNs may be implemented by a multilayer perceptron (MLP). In example embodiments, the second NN outputs the context vector based on input that can include at least two of:

(a) word embedding predicted by the captioning NN in a previous time step, (b) a last hidden state from the captioning NN, (c) a mean-pooled feature representation of the image, and (d) a globally mean-pooled bottom-up region feature from among a set of features.

In another aspect, a computer memory includes instructions executable by a processor to process feature vectors using a first neural network (NN), input at least one context vector to a second NN, and combine outputs of the first and second NNs for input to a third NN. The third NN outputs attention information. The instructions are executable to combine the attention information with the output of the first NN to output a contextual feature vector useful for predicting a word of a caption of an image represented by the feature vectors.

The details of the present application, both as to its structure and operation, can best be understood in reference to the accompanying drawings, in which like reference numerals refer to like parts, and in which:

BRIEF DESCRIPTION OF THE DRAWINGS

FIG. 4 is a flow chart illustrating example logic for generating feature vectors from the image and using the feature vectors, outputting a natural language caption describing the image;

FIG. 5 is a block diagram of the overall image captioning model;

DETAILED DESCRIPTION

Figure 1:
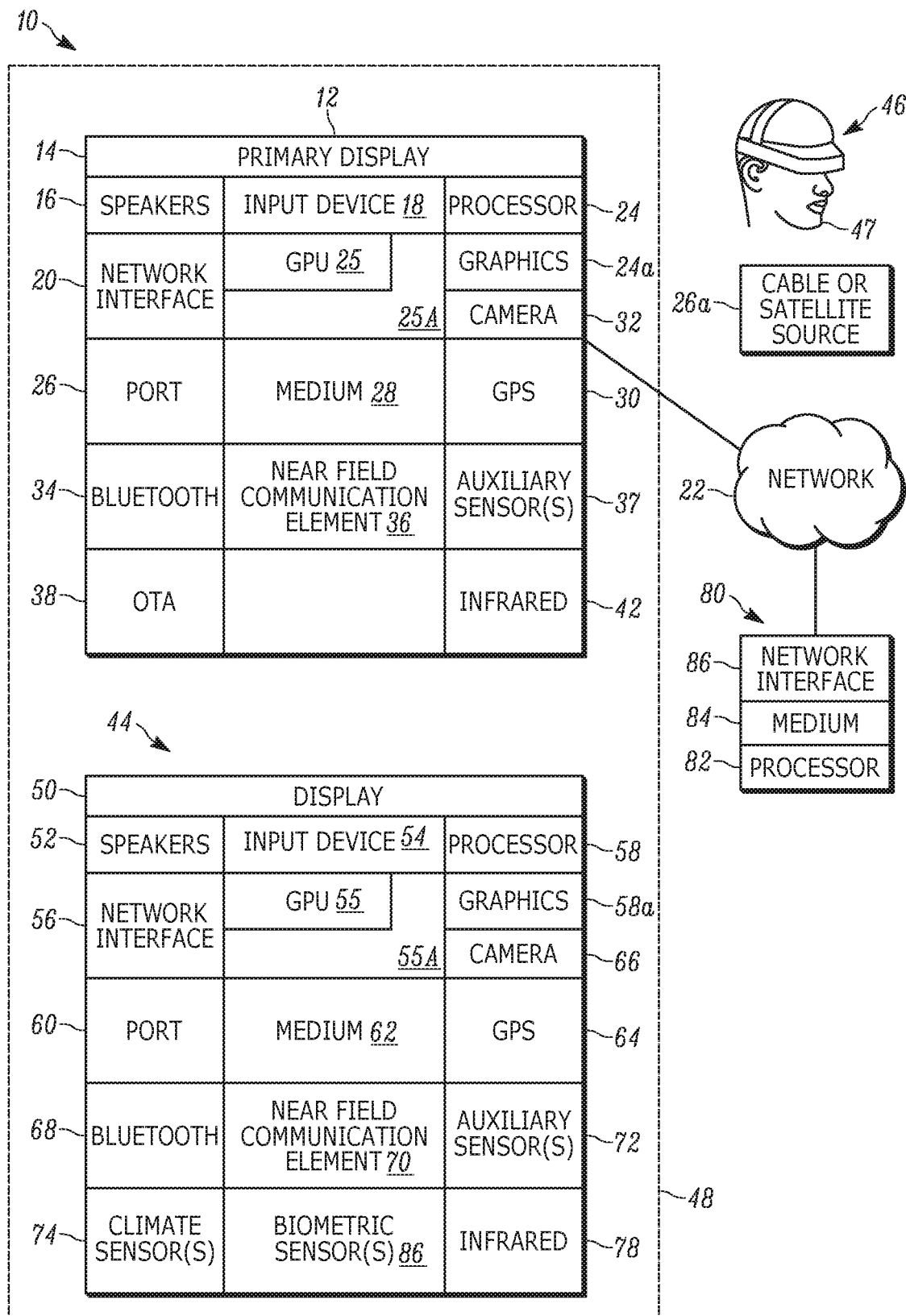
FIG. 1 is a block diagram of an example system consistent with present principles.

To foster understanding of certain terms herein, top-down attention refers to exploiting contextual information related to images in various ways to guide attention over spatial locations or temporal features. In contrast to top-down attention, bottom-up attention selectively draws attention to a number of salient regions in the images automatically without providing extra contextual information. A bottom-up attention network can be used to detect salient objects in the input image and extract features as input to the image captioning model. As understood herein, top-down attention can risk losing information and bottom-up attention can neglect spatial attention in the detected regions.

This disclosure also relates generally to computer ecosystems including aspects of consumer electronics (CE) device networks such as but not limited to distributed computer game networks, augmented reality (AR) networks, virtual reality (VR) networks, video broadcasting, content delivery networks, virtual machines, and artificial neural networks and machine learning applications.

A system herein may include server and client components, connected over a network such that data may be exchanged between the client and server components. The client components may include one or more computing devices including AR headsets, VR headsets, game consoles such as Sony PlayStation® and related motherboards, game controllers, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple, Inc. or Google. These operating environments may be used to execute one or more programs/applications, such as a browser made by Microsoft or Google or Mozilla or other browser program that can access websites hosted by the Internet servers discussed below. Also, an operating environment according to present principles may be used to execute one or more computer game programs/applications and other programs/applications that undertake present principles.

Servers and/or gateways may include one or more processors executing instructions that configure the servers to receive and transmit data over a network such as the Internet. Additionally, or alternatively, a client and server can be connected over a local intranet or a virtual private network. A server or controller may be instantiated by a game console and/or one or more motherboards thereof such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or video game website to network users to communicate crowdsourced in accordance with present principles.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

As indicated above, present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below may be implemented in hardware circuitry or software circuitry. When implemented in software, the functions and methods can be written in an appropriate language such as but not limited to Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, an augmented reality (AR) headset, a virtual reality (VR) headset, Internet-enabled or "smart" glasses, another type of wearable computerized device such as a computerized Internet-enabled watch, a computerized Internet-enabled bracelet, a computerized Internet-enabled music player, computerized Internet-enabled head phones, a computerized Internet-enabled implantable device such as an implantable skin device, other computerized Internet-enabled devices, etc. Regardless, it is to be understood that the AVD 12 is configured to undertake present principles (e.g., communicate with other consumer electronics (CE) devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors. Thus, the interface 20 may be, without limitation, a Wi-Fi transceiver, which is an example of a wireless computer network interface, such as but not limited to a mesh network transceiver. Furthermore, note the network interface 20 may be, e.g., a wired or wireless modem or router, or other appropriate interface such as, for example, a wireless telephony transceiver, or Wi-Fi transceiver as mentioned above, etc.

It is to be understood that the one or more processors control the AVD 12 to undertake present principles, including the other elements of the AVD 12 described herein such as controlling the display 14 to present images thereon and receiving input therefrom. The one or more processors may include a central processing unit (CPU) 24 as well as a graphics processing unit (GPU) 25 on a graphics card 25A.

In addition to the foregoing, the AVD 12 may also include one or more input ports 26 such as, e.g., a high definition multimedia interface (HDMI) port or a USB port to physically connect (e.g., using a wired connection) to another consumer electronics (CE) device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes. The source 26a when implemented as a game console may include some or all of the components described below in relation to the CE device 44 and may implement some or all of the logic described herein.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to, e.g., receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to, for example, determine the location of the AVD 12 in all three dimensions.

Continuing the description of the AVD 12, in some embodiments the AVD 12 may include one or more cameras 32 that may be, e.g., a thermal imaging camera, a digital camera such as a webcam, an infrared (IR) camera, and/or a camera integrated into the AVD 12 and controllable by the processor 24 to generate pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other consumer electronics (CE) device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as an AR or VR headset worn by a user 47 as shown. In the example shown, only two CE devices 44, 46 are shown, it being understood that fewer or greater devices may also be used in accordance with present principles.

In the example shown, all three devices 12, 44, 46 are assumed to be members of a network such as a secured or encrypted network, an entertainment network or Wi-Fi in, e.g., a home, or at least to be present in proximity to each other in a certain location and able to communicate with each other and with a server as described herein. However, present principles are not limited to a particular location or network unless explicitly claimed otherwise.

The example non-limiting first CE device 44 may be established by any one of the above-mentioned devices, for example, a smart phone, a digital assistant, a portable wireless laptop computer or notebook computer or game controller (also referred to as "console"), and accordingly may have one or more of the components described below. The second CE device 46 without limitation may be established by an AR headset, a VR headset, "smart" Internet-enabled glasses, or even a video disk player such as a Blu-ray player, a game console, and the like. Still further, in some embodiments the first CE device 44 may be a remote control (RC) for, e.g., issuing AV play and pause commands to the AVD 12, or it may be a more sophisticated device such as a tablet computer, a game controller communicating via wired or wireless link with a game console implemented by another one of the devices shown in FIG. 1 and controlling video game presentation on the AVD 12, a personal computer, a wireless telephone, etc.

Accordingly, the first CE device 44 may include one or more displays 50 that may be touch-enabled for receiving user input signals via touches on the display 50. Additionally, or alternatively, the display(s) 50 may be an at least partially transparent display such as an AR headset display or a "smart" glasses display or "heads up" display, as well as a VR headset display, or other display configured for presenting AR and/or VR images.

The first CE device 44 may also include one or more speakers 52 for outputting audio in accordance with present principles, and at least one additional input device 54 such as, for example, an audio receiver/microphone for entering audible commands to the first CE device 44 to control the device 44. The example first CE device 44 may further include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as, e.g., controlling the display 50 to present images thereon and receiving input therefrom. Furthermore, note that the network interface 56 may be, for example, a wired or wireless modem or router, or other appropriate interface such as a wireless telephony transceiver, or Wi-Fi transceiver as mentioned above, etc.

Still further, note that in addition to the processor(s) 58, the first CE device 44 may also include a graphics processing unit (GPU) 55 on a graphics card 55A. The graphics processing unit 55 may be configured for, among other things, presenting AR and/or VR images on the display 50.

In addition to the foregoing, the first CE device 44 may also include one or more input ports 60 such as, e.g., a HDMI port or a USB port to physically connect (e.g., using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to, e.g., receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to, e.g., determine the location of the first CE device 44 in all three dimensions.

Continuing the description of the first CE device 44, in some embodiments the first CE device 44 may include one or more cameras 66 that may be, e.g., a thermal imaging camera, an IR camera, a digital camera such as a webcam, and/or another type of camera integrated into the first CE device 44 and controllable by the CE device processor 58 to generate pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the CE device processor 58. The first CE device 44 may include still other sensors such as, for example, one or more climate sensors 74 (e.g., barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage. In an implementation, the medium 84 includes one or more solid state storage drives (SSDs). The server also includes at least one network interface 86 that allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as a wireless telephony transceiver. The network interface 86 may be a remote direct memory access (RDMA) interface that directly connects the medium 84 to a network such as a so-called "fabric" without passing through the server processor 82. The network may include an Ethernet network and/or fiber channel network and/or InfiniBand network. Typically, the server 80 includes multiple processors in multiple computers referred to as "blades" that may be arranged in a physical server "stack".

Accordingly, in some embodiments the server 80 may be an Internet server or an entire "server farm" and may include and perform "cloud" functions such that the devices of the system 10 may access a "cloud" environment via the server 80 in example embodiments for, e.g., domain adaptation as disclosed herein. Additionally, or alternatively, the server 80 may be implemented by one or more game consoles or other computers in the same room as the other devices shown in FIG. 1 or nearby.

To briefly summarize present principles prior to describing implementation details below, bottom-up attention is combined with top-down attention in a multi-level residual attention-based image captioning model. A residual top-down attention model, referred to in the figures and elsewhere as the ResTD attention network, prevents information loss in typical visual attention networks. A bottom-up attention network, referred to in the figures and elsewhere as the ResTD_BP network, uses a residual top-down attention module referred to herein as ResTD_1 with attentional pooling. In this way, improved feature representation is learned for each detected region by taking the different importance of each spatial location into consideration.

Moreover, a new residual top-down attention network, referred to herein as ResTD_2, is implemented in the image captioning model to learn attention distribution among the input bottom-up regional feature vectors, so that more relevant region information to the next word to be predicted will be selected. Moreover, present principles provide a caption generation network including a number of residual top-down attention based long short-term memory (LSTM) units, referred to herein as ResTD_LSTM. In each ResTD_LSTM unit, in addition to the input bottom-up regional feature vectors, four contextual vectors are combined, e.g., are concatenated, and input to a multilayer perceptron (MLP) module to learn an overall contextual vector as the input to ResTD_2 (the residual top-down attention network in the caption generator), to provide contextual information for the attention distribution learning. Also, in the caption generation network, the output word at time step t−1 can be treated as a contextual vector and input to the next ResTD_LSTM unit at time step t.

Potential applications of present principles include, but are not limited to, on-demand accessibility in computer games. For instance, some game players are visually impaired, and by using image captioning, a description of the scene can be generated and converted to speech with the help of TTS (Text to Speech) techniques. In addition, it happens that game players can be interrupted in the middle of the game and they want to proceed with the game, then with the help of image captioning, they can hear the ongoing game while staying away from the computer or game consoles. Other applications include game object detection so that better image representations can be learned for given images by considering the spatial location in each region. Present principles may also be used to improve facial emotion recognition by detecting different parts of a human face, e.g., face, eyes, nose, lip, etc. By implementing residual top-down attention over the detected facial parts, those parts that are more relevant to a specific emotion will be selectively attended to. Furthermore, present principles can be adapted for use in real world video description.

Figure 2:
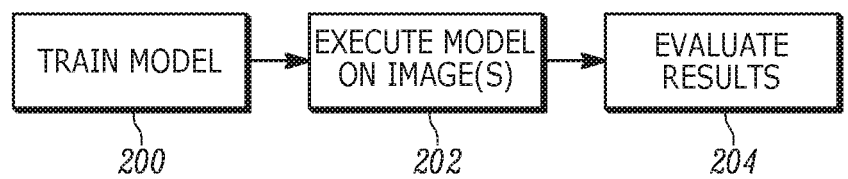
FIG. 2 is a flow chart illustrating example overall logic.

With the above in mind and turning now to FIG. 2 for an overall understanding of present principles, the neural network models discussed further below are trained using a training data set at block 200. Once trained, the models are executed on one or more images at block 202 according to discussion that follows. The results are evaluated at block 204.

For game image capturing, example training at block 200 may use the Visual Genome dataset discussed in Krisna et al., "Visual Genome: Connecting Language and Vision Using Crowdsourced Dense Image Annotations", *Int'l Journal of Computer Vision,* 123(1):32-73 (2017). In addition, a gaming image dataset may be used to train one or more convolutional neural networks (CNN) described below, e.g., the Faster R-CNN, for region proposal generation and image feature extraction. For image captioning, two datasets including, in some examples, the visual common objects in context (V-COCO) dataset and a gaming dataset may be used. The V-COCO dataset is a subset of the Microsoft COCO dataset described in Lin et al., in "Common Objects in Context", *European Conference on Computer Vision,* pages 740-755, Springer, 2014.

Additionally, for training the networks a gaming dataset may be generated for gaming image captioning. As the dataset name suggests, multiple images (e.g., several thousand) from multiple game videos (e.g., several hundred)

may be collected and annotated with region descriptions, bounding boxes, and associated object names. The gaming dataset can be split into three parts, namely, for training, validation and test, respectively.

For evaluation at block 204, in some examples, to evaluate the performance of the attention-based image captioning network described further below on, for example, PlayStation® images, only gaming images (test split of the above-described gaming dataset) may be used for model evaluation. ResNet-101 may be used for feature embedding learning. To evaluate the gaming captioning results, a set of different metrics may be deployed, including CIDEr, METEOR, ROUGE, BLEU, as well as SIM_USE.

Figure 3:
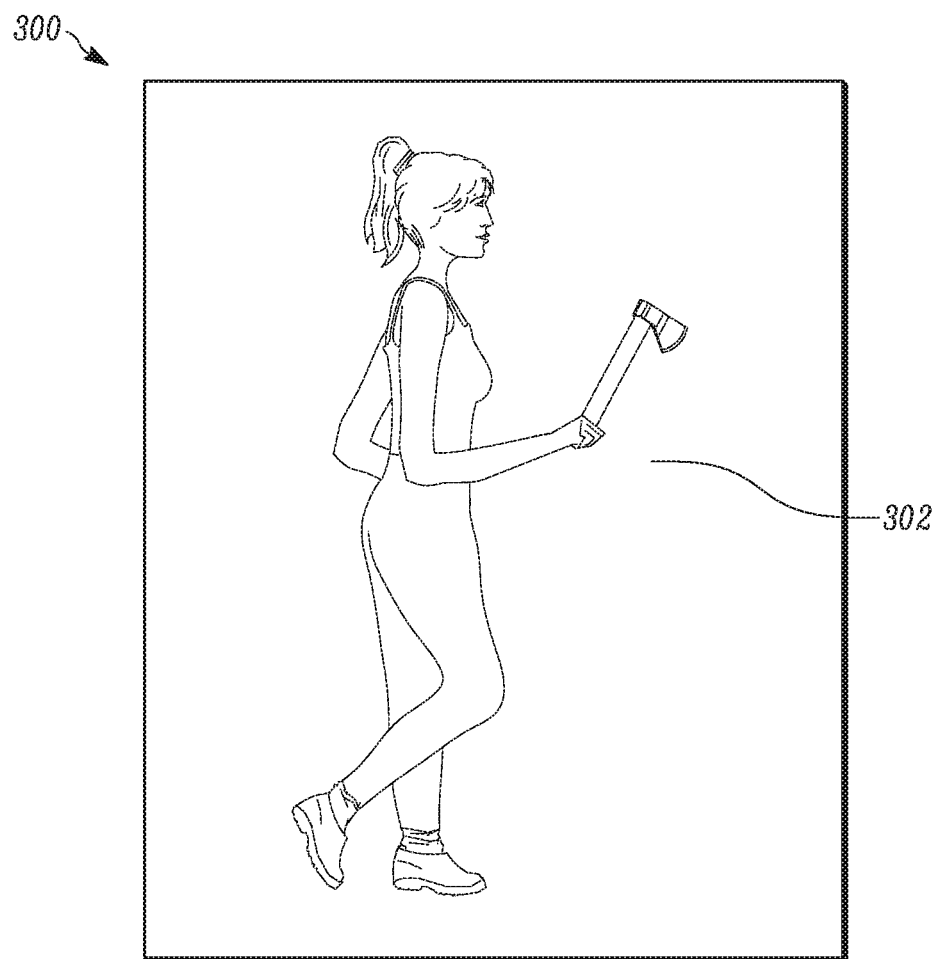
FIG. 3 is a schematic diagram of an example image that may be from a computer game simulation or other computer simulation or from real world video.

FIG. 3 illustrates an example image 300 in which a gaming image of a woman 302 in the act of running while raising an ax is shown.

FIG. 4 illustrates overall logic which commences at block 400, in which the image 300 (for example) is processed using one or more CNNs to produce bottom-up feature vectors (FVs) that contain information describing characteristics of the image, such as, for example, colors in the image, object boundaries in the image, types of objects in the image, etc. As discussed further below, in an example embodiment, region feature vectors are extracted using an attention-based Faster R-convolutional neural network (CNN), such that for each image, a large number of feature vectors are extracted for different regions in the image. As also discussed further below, bottom-up feature vectors with attention are extracted based on a Faster R-CNN network (which is for object detection), and ResNet-101 (CNN) servers as part of the faster R-CNN network.

The feature vectors are input at block 402 to a residual top-down network, described further below, to produce a natural language caption for the image at block 404. As described in greater detail shortly, the residual top-down network can combine an attention vector with an average pooling vector derived from the feature vectors. The caption may be presented in human-perceptible form, e.g., visually and/or audibly and/or tactilely at block 406 on one or more output devices such as video displays, audio speakers, buzzers, etc.

FIG. 5 illustrates an example overall model composed primarily of two parts, namely, a ResTD_BP neural network 500 to extract bottom-up regional features from the image 300 and output region features 502, and a caption generation network 504 that receives the extracted region features to predict, using multiple modules 506 in succession, captions 508 word by word in natural language describing the image 300 (in the example shown, "a woman running with axe"). The bottom-up attention model of the ResTD_BP neural network 500 may include a Faster R-CNN network to extract region features based on their saliency in the image 300. However, instead of extracting regional features through global average pooling over feature maps output from the RoI pooling layer, a top-down attention is introduced into the Faster R-CNN based bottom-up attention network as described further below, with residual attentional pooling implemented by a residual top-down attentional network (ResTD-1) to learn regional feature representations by selectively attention to some areas in each region.

Figure 6:
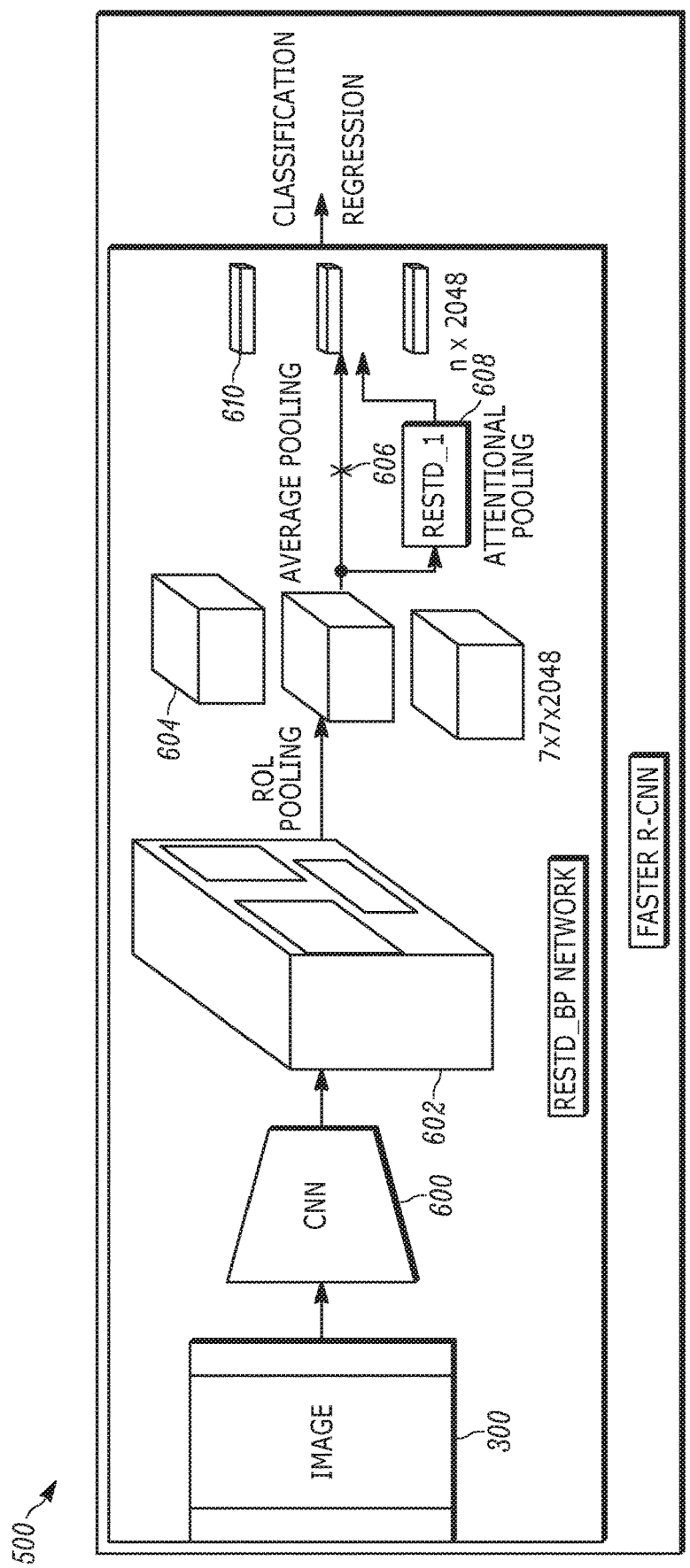
FIG. 6 is a block diagram of the feature vector generation model that extracts region feature vectors.
Figure 7:
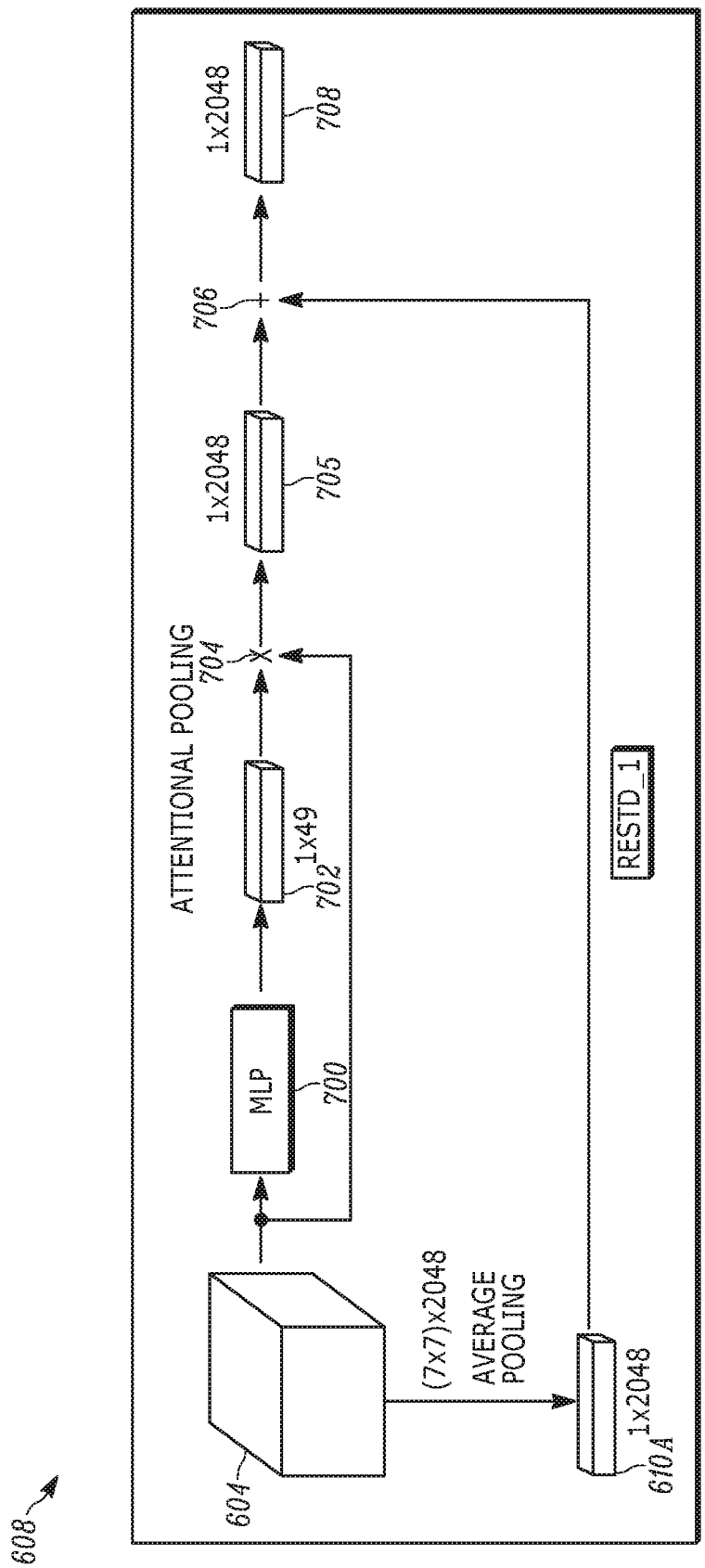
FIG. 7 is a block diagram of the residual top-down attention module used in the feature vector generation model of FIG. 6.

Accordingly, and turning now to FIGS. 6 and 7 for a detailed understanding of an example implementation of the ResTD_BP network 500, the image 300 is input and processed through a deep convolutional neural network 600 such as a ResNet-101 neural network to extract a set of bottom-up region features 602 for each given image 300. Then a Region Proposal Network is applied over the intermediate feature maps to predict a number of region proposals, among which only a subset may be selected by applying non-maximum suppression and IoU threshold. Then region of interest (RoI) pooling is deployed to extract feature maps 604 typically of fixed size for each selected region. As indicated by the "X" 606 in FIG. 6, instead of applying global average pooling, a residual top-down attention network 608 can be used to pool the region feature maps attentionally. The output of the ResTD_BP network is a set of region feature vectors 610, which are input to the caption generation network 504 shown in FIG. 5 and described further in reference to FIGS. 9-11.

FIG. 7 illustrates details of the residual top-down attention network 608 (referred as "ResTD-1" in the figures) in the bottom-up attention network ("ResTD_BP"). As shown, the feature maps 604 of a certain region after RoI pooling, each having a dimension in the example shown of 7×7× 2048, are input to a neural network. In the example shown, the neural network can be a feedforward artificial neural network and in specific implementations a multilayer perceptron (MLP) 700 that can be associated with a softmax activation function to learn the attention distribution over the N (in the example shown, N=49) spatial locations of the region features, which may be represented by an attention vector 702 with the shape of 1×N. The attention vector 702 may be combined at 704 with the features 604, e.g., attentional pooling may be executed by implementing a weighted sum over the feature vectors of the N locations with the learned attention vector 702, resulting in an attentionally-pooled global feature vector 705 that may have the dimension of 1×2048.

Recognizing that no extra contextual information is introduced in the bottom-up attention network to guide the top-down attention, a residual module is implemented in the top-down attention network to prevent losing important information from attentional pooling. More specifically, the attentionally-pooled feature vector 705 is combined at 706, e.g., using elementwise addition, with the mean-pooled global feature vector 610A for the region under test to output a final feature vector 708 for that region.

Figure 8:
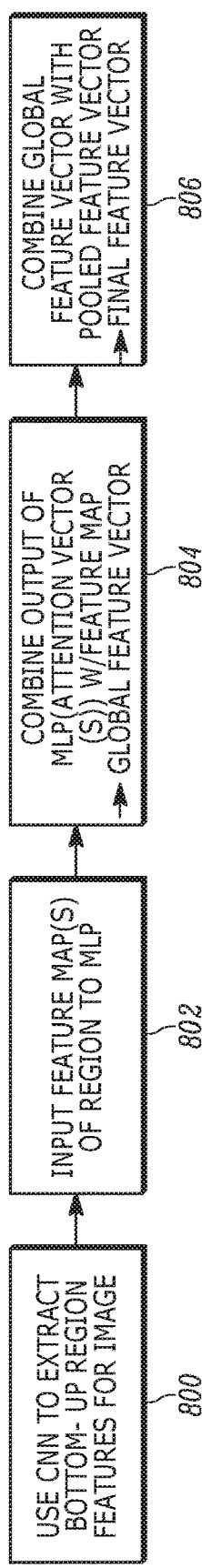
FIG. 8 is a flow chart illustrating example logic executed by the components of FIGS. 6 and 7.

FIG. 8 illustrates, in flow chart form for ease of exposition and not by way of programming limitation, logic that is embodied in the system of FIGS. 7 and 8. Commencing at block 800, a convolutional neural network (CNN) generates feature maps from the image that is input to the CNN. Moving to block 802, at least a first feature map of the feature maps is processed using a neural network such as a multilayer perceptron (MLP) to generate an attentionally pooled global feature vector, representing at least one characteristic of the image. Proceeding to block 804, the attention vector is combined with the first feature map to render an output feature vector, which at block 806 is combined with a pooled feature vector such as a mean-pooled feature vector derived from the first feature map to render a final feature vector. The final feature vector can be to a caption generation network to generate a natural language caption for the image.

Figure 9:
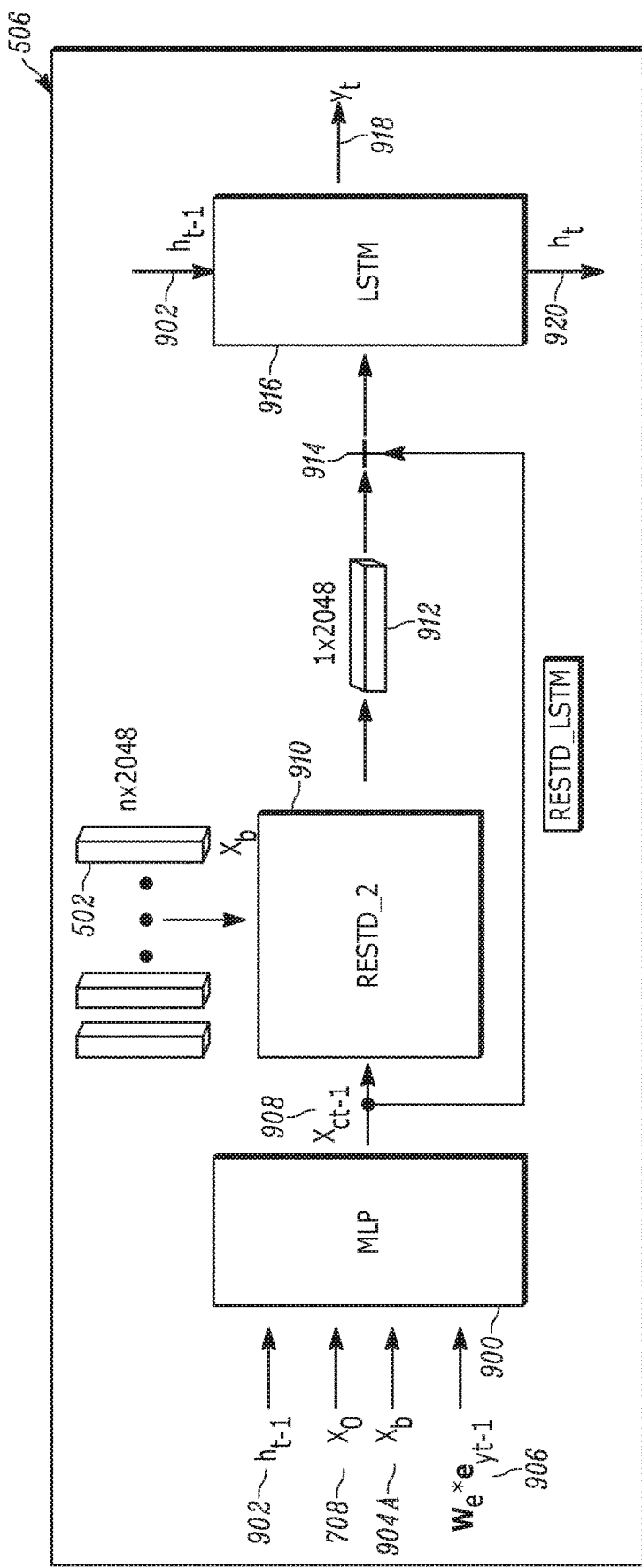
FIG. 9 is a block diagram of one of the LSTM units of the caption generation model, it being understood that the caption generation network typically is composed of a number of such LSTM units.
Figure 10:
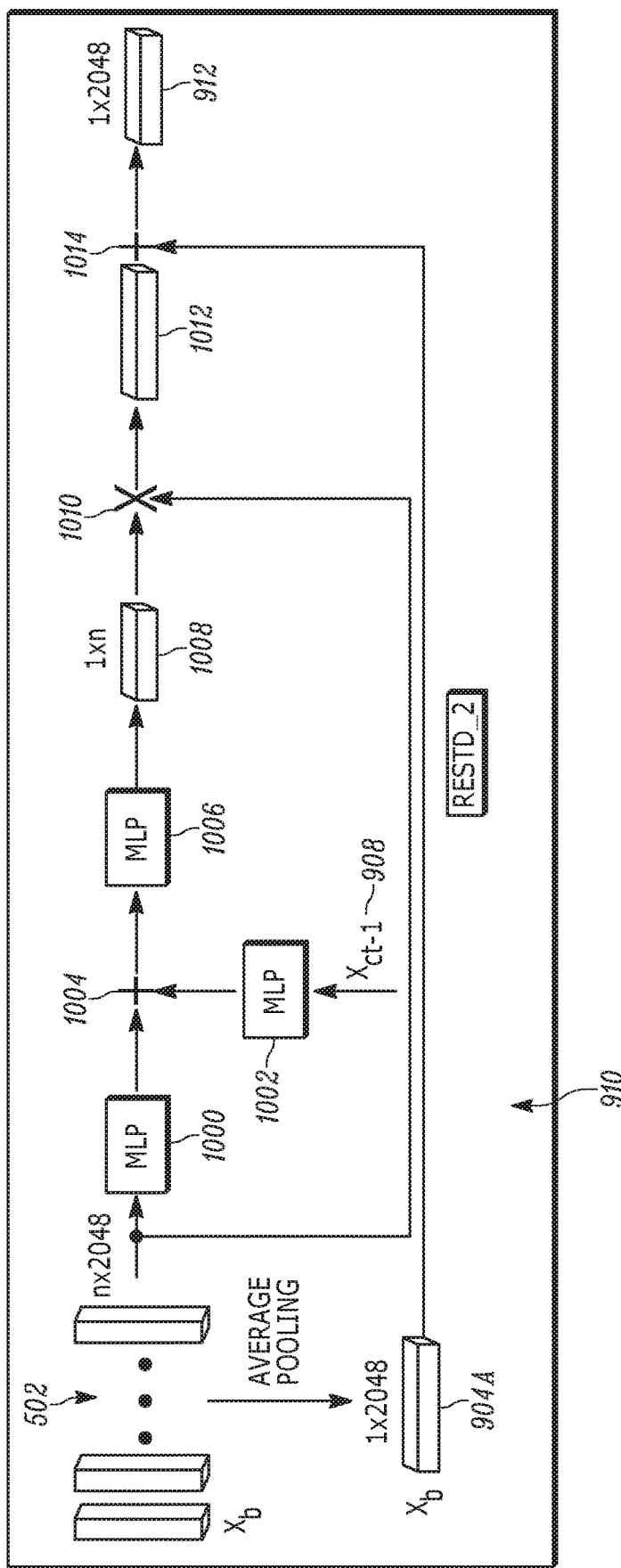
FIG. 10 is a block diagram of the residual top-down attention module used in the caption generation model of FIG. 9.
Figure 11:
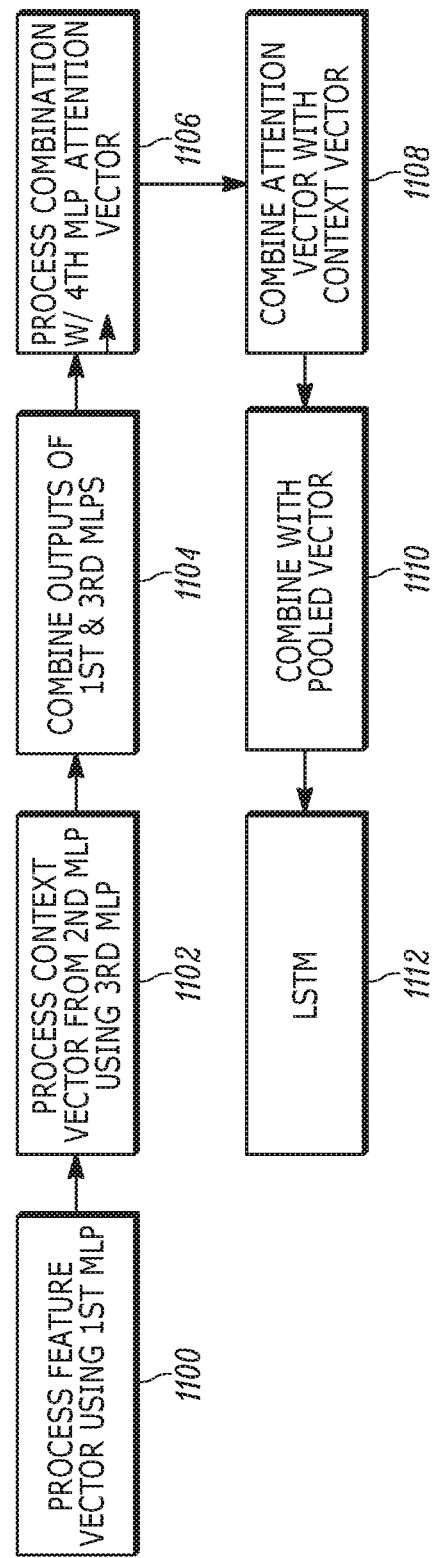
FIG. 11 is a flow chart illustrating example logic executed by the components of FIGS. 9 and 10.

Turning now to FIGS. 9-11 for an understanding of the caption generation network 504 shown in FIG. 5 (illustrating only one of the plural modules 506 for clarity, referred to herein as residual top-down attention LSTM (ResTD_L-STM) module), the set of region feature vectors 502 from the network 500 in FIG. 5 is the input to predict a caption word by word at each time step. By applying residual top-down attention, at each time step, the caption generation LSTM is able attend to selective regions and generate caption words attentionally.

As shown, the example ResTD_LSTM can include two parts, including a residual top-down attention model and a long short-term memory (LSTM)-based caption prediction model. The input to a neural network such as a multilayer perceptron (MLP) 900 of the ResTD_LSTM at time step t includes contextual information, including the word embedding 906 predicted from the previous time step (denoted $W_e * E_{yt-1}$ in FIG. 9), the last hidden state 902 from caption generation LSTM (denoted $h_{t-1}$), the mean-pooled feature representations 708 of the entire image $x_0$, as well as the globally mean-pooled bottom-up region feature 904A (denoted $x_b$) from among a set of features (denoted $X_b$ in FIG. 10 below). Note that the bottom-up feature vectors 502 in FIG. 5 are the same as those designated $X_b$ in FIG. 9.

The contextual information is combined, e.g., through concatenation or addition, with two global image representations and fed to the MLP 900 to output a learned general contextual vector 908 (denoted $x_{ct-1}$) as input to guide a second residual top-down attention network 910, denoted ResTD_2 and shown in detail in FIG. 10. Taking the contextual vector 908 ($x_{ct-1}$) and the set of bottom-up feature vectors 502 as input, the ResTD_2 model 910 learns the attention distribution in the input bottom-up regional feature vectors, and selectively attends to certain regions that are more relevant to the word to be predicted. A general feature vector 912 is output by the module 910 and combined at 914 with the contextual vector 908 $x_{ct-1}$. The combination from state 914 is input to an LSTM module 916 together to predict the next word 918 of the caption, denote $y_t$ in FIG. 9. Note that the LSTM 916 also takes as input the last hidden state 902 ($h_{t-1}$) and outputs a current hidden state 920 ($h_t$) for use in the next input stage.

FIG. 10 illustrates details of the ResTD_2 module 910 shown in FIG. 9. Note that like the previously-described ResTD_1 module of FIG. 7, the ResTD_2 of FIG. 9 is a residual top-down attention network which helps to select certain regions that are more related to the next word to be predicted. The module of FIG. 10, however, in contrast to that of FIG. 7, in addition to receiving, at a first neural network 1000 that may be implemented by a MLP, the set 502 of input feature vectors $X_b$, also receives, at a second neural network 1002 that may be implemented by a MLP, the context vector 908 ($x_{ct-1}$) to help learn the attention distribution in the set of input bottom-up region feature vectors. The outputs of the neural networks 1000, 1002 are combined at 1004 (e.g., using addition) and input to a third neural network 1006, which also may be implemented by an MLP.

The third NN 1006 outputs another attention vector 1008 which is combined at 1010 (e.g., as by multiplication) with the set 502 of input feature vectors $X_b$, to produce a product 1012 which in one embodiment is an attentionally-pooled global feature vector. In turn, the product 1012 is combined at 1014 (e.g., by addition) with the globally mean-pooled bottom-up region feature 904A (denoted $x_b$) to produce as output the general feature vector 912. Thus, the residual module is implemented in the caption generation module as well to prevent important feature information leakage.

FIG. 11 illustrates, in flow chart form for ease of exposition and not by way of programming limitation, logic that is embodied in the system of FIGS. 9 and 10. Commencing at block 1100, feature vectors representing characteristics of an image are processed using a first neural network (NN) (such as the network 1000 in FIG. 10). Moving to block 1102, a context vector output by a second NN (such as the initial NN 900 in FIG. 9) is processed using a third NN (such as the NN 1002 shown in FIG. 10). At block 1104 the output of the first NN is combined (such as at 1004 in FIG. 10) with the output of the third NN to render an input to a fourth NN (such as the NN 1006) to render an attention vector 1008 at block 1106. Essentially, in one embodiment at block 1106 combined feature vectors are embedded with the third MLP to produce an attention vector.

Moving to block 1108, the attention vector is combined (such as at 1010) with one or more of the feature vectors to render a combined vector (such as the product 1012, which may be an attentionally pooled feature vector). At block 1108, input region feature vectors can be fused/pooled with the attention vector, to output an attentionally pooled global feature vector, referred to for shorthand as the "combined vector".

Proceeding to block 1110, the attentionally-pooled feature vector is combined with a pooled vector (such as the globally mean-pooled bottom-up region feature 904A) that is derived from the feature vectors to render an attention vector (such as the attention feature vector 912). At block 1112 the attention vector is processed by the LSTM to generate at least one word describing the image.

Figure 12:
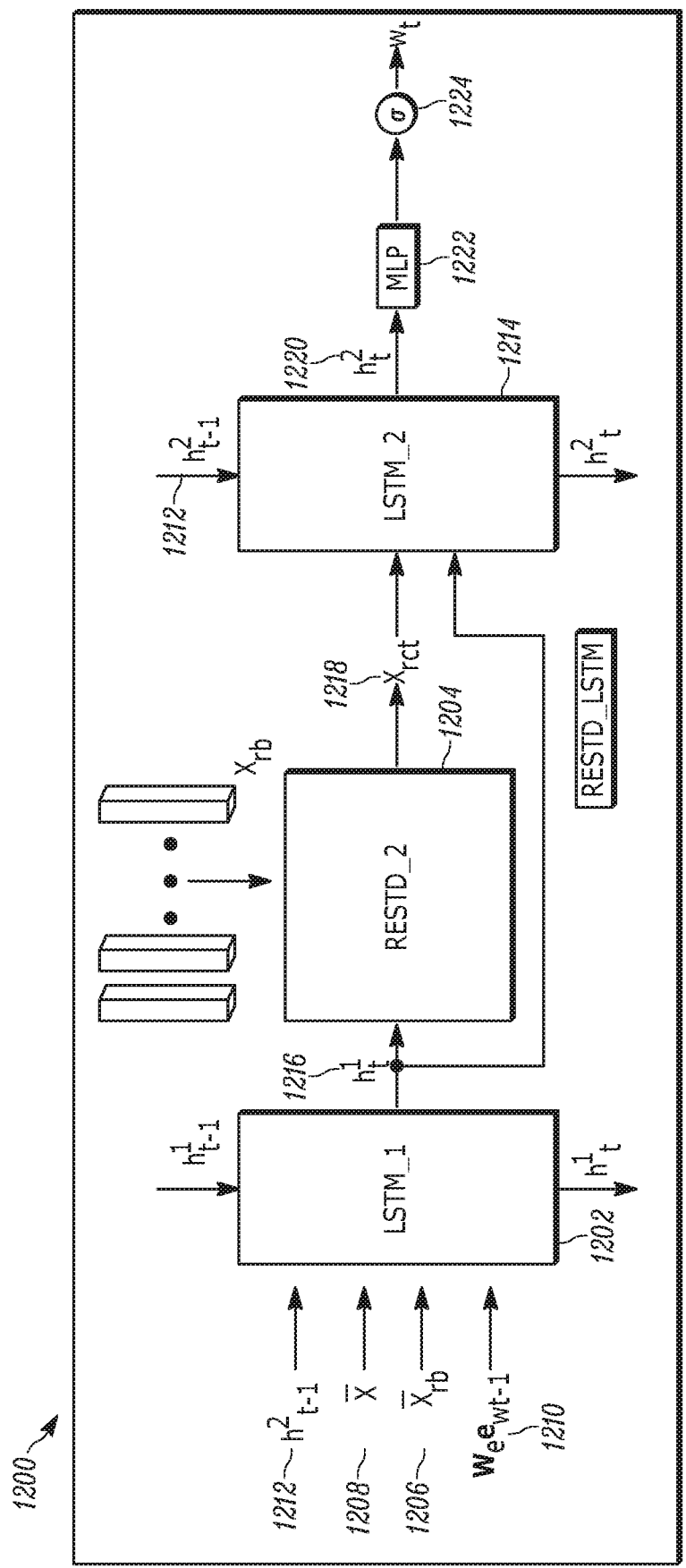
FIG. 12 is a block diagram of an alternate caption generation model.
Figure 13:
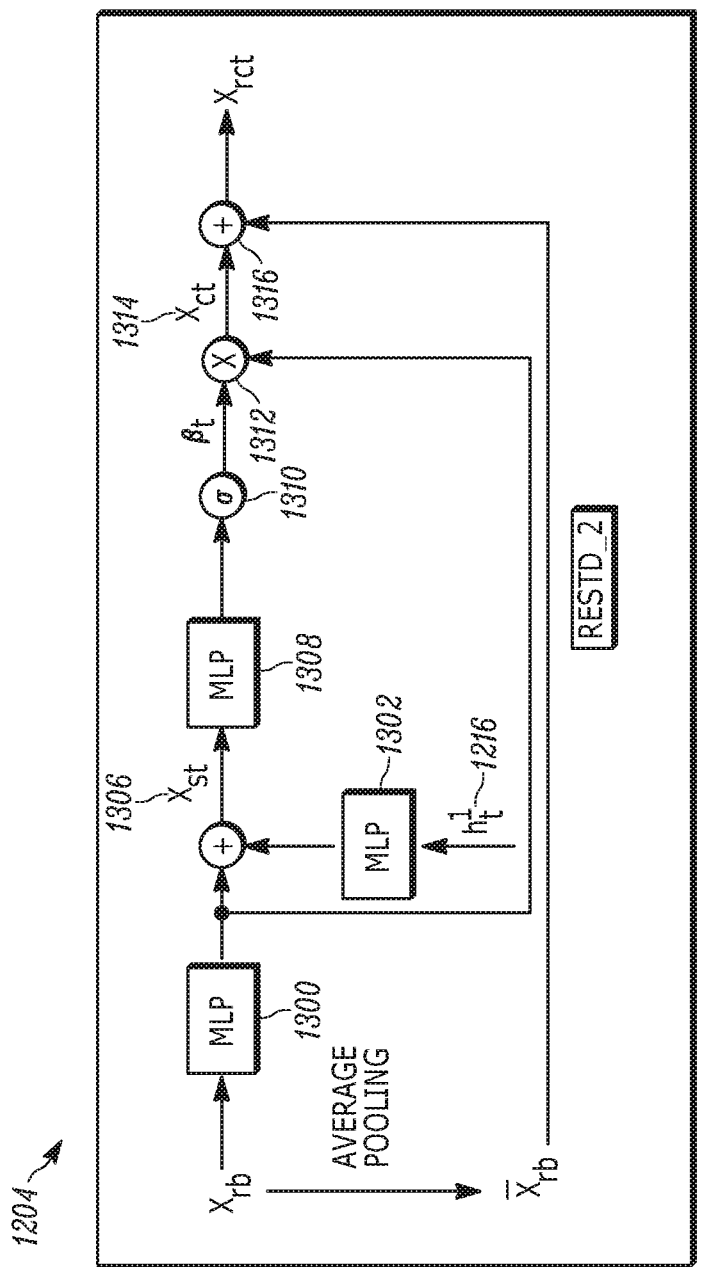
FIG. 13 is a block diagram of the residual top-down attention module used in the caption generation model of FIG. 12.

FIGS. 12 and 13 illustrate an alternate caption generation network 1200 (labeled ResTD_LSTM). The alternate caption generation network 1200 includes a first neural network that may be implemented by a first LSTM cell 1202. The first LSTM cell 1202 combines the image feature information with the context information. In an example, the first LSTM cell 1202 concatenates these two pieces of information to form a general contextual vector labeled $h^1_t$ in FIG. 12. The contextual vector is sent to be forwarded to a residual top-down attention network 1204, denoted ResTD_2 and shown in detail in FIG. 13, as a guidance to assist attention distribution learning.

With greater specificity, an average pooling over $X_{rb}$ (the set of region feature vectors 502 from FIG. 5) is obtained to yield a mean-pooled global bottom-up feature vector 1206 (labeled $x_{rb}$), which is input to the first LSTM 1202. Recognizing that the set of region feature vectors $X_{rb}$ only covers the feature representations of N different regions, it lacks some features of the entire image. To resolve the data loss problem, the global feature vector 1208 (labeled X with an average line over it in FIG. 12) of the entire image is input to the first LSTM 1202. This global feature vector can be obtained by conducting global average pooling over the set X.

Additionally, the first LSTM 1202 receives as input two components 1210, 1212 of contextual information, specifically, the word embedding predicted from previous time step (labeled $W_e e_{wt-1}$ in FIG. 12) and the hidden state (labeled $h_{t-1}^2$) obtained in the previous time step of a caption generation neural network 1214, which may be implemented by a second LSTM cell labeled LSTM_2 in FIG. 12. The output 1216 of the first LSTM 1202, labeled $h^1_t$, is a general contextual vector that is sent to the neural network 1204.

Note that the general contextual vector may be calculated as:

$$h^1_t = \text{LSTM}([h^2_{t-1}; x; x_{rb}; W_e 1_{wt-1}]; h^1 t-1);$$

where $W_e 1_{wt-1}$ is the one-hot embedding of word $w_{t-1}$, $W_e \in R^{M \times V}$, and V is the size of the vocabulary of image captions.

As shown in FIG. 12, the global context vector $h^1_t$ and the set of region feature vectors $X_{rb}$ from FIG. 5 are input into the second residual top-down attention network 1204 (ResTD_2) to learn the attention distribution over the N regions and to fuse them so as to obtain an output contextual vector 1218 (labeled $x_{rct}$), which is input to the second neural network 1214. The second neural network 1214 also receives as input the hidden state 1212 ($h^2_{t-1}$) from the previous time step, and the general contextual vector 1216 ($h^1_t$) from the first neural network 1202. The output 1220 of the second neural network 1214 is the current hidden state $h^2_t$, which is input both to the first neural network 1202 in the next time step as hidden state 1212 and to a single-layer perceptron 1222, followed by a softmax function 1224 to predict the next word $w_t$. Specifically, the distribution over the next possible word at time step t is:

$$p_\theta = (w_t | w_1, \ldots w_{t-1}) = \sigma(W_w h^2 t),$$

where $W_w \in R^{H \times V}$ and $\theta$ are the model parameters. The word predicted at time step t–1 is:

$$w_t = \mathrm{argmax}(w) p_\theta(w | w_1, \ldots w_{t-1}).$$

In examples, given a sequence of ground truth words $w^* = (w^*_1, \ldots w^*_T)$, the image captioning network can be trained by minimizing the cross-entropy loss. In an example, the cross-entropy loss $L(\theta)$=sum over t=1 to T of the log $p_\theta(w^*_t | w^*_1, \ldots w^*_{t-1})$.

Turning now to FIG. 13 for an understanding of the ResTD_2 Network 1204 shown in FIG. 12, this residual top-down attention network selectively attends to certain regions that are more relevant to the next word to be predicted. As shown in FIG. 13, the region feature vectors $X_{rb}$ are sent to a first neural network 1300, which may be implemented by a single layer perceptron, while the context vector 1216 ($h^1_t$) is input to a second neural network 1302, which also may be implemented by a single layer perceptron. The outputs of the first and second NNs 1300, 1302 are combined at 1304 as by summing element-wise in one example to produce a combined output 1306, labeled $x_{st}$, which in turn is input to a third NN 1308, which also may be implemented by a MLP such as a two-layer perceptron. The output 1310 that is learned by the third NN 1308 is an attention distribution of the N region feature vectors. Specifically:

$$x_{st} = \sigma(W_h h^1_t \oplus \sigma(W_r X_{rb})); \text{ and}$$

$$\beta_t = \sigma(W_{s2} \sigma(W_{s1} x_{st})),$$

where $W_r \in R^{K \times D}$, $W_h \in R^{R \times M}$, $W_{s1} \in R^{P \times K}$, and $W_{s2} \in R^K$. Given the attention distribution over input region feature vectors $\beta_t$, the N different regional features can be combined (e.g., fused) at 1312 with the output of the first NN 1300 to output a contextual feature vector 1314 (labeled $x_{ct}$) which is equal to the sum over i=1 to N of $\beta_i x_{rbi}$.

At 1316, to prevent information loss in attentional pooling, the contextual feature vector 1314 (labeled $x_{ct}$) may be combined (e.g., as by concatenation) with the global feature vector 1206, which may be obtained, recall, using average pooling over $X_{rb}$. This yields the general context feature vector 1218 (labeled $x_{rct}$ in FIG. 12)=$x_{ct} \oplus x_{rb}$.

It may now be appreciated that a multilevel residual attention-based image captioning model for gaming scene understanding is provided by integrating bottom-up attention with top-down attention. Firstly, to solve the problem of losing important information in the process of feature fusion with the learned attention weights from top-down attention, a novel residual attention network is provided which helps to compensate the lost information. To apply residual attention for caption prediction, a novel residual top-down attention-based LSTM unit is provided. Additionally, a residual top-down attention network is implemented in the bottom-up attention network to further learn better region feature representations. To validate the performance for gaming scene understanding, a gaming image captioning dataset is accessed.

To further illustrate the attention mechanisms described above, learned attention maps corresponding to different timesteps may be visualized. Specifically, the learned attention weights for each feature vector can be reshaped, resized and overlaid on the gaming images. Additionally, a region may be circled with a red bounding box indicates the most important area (corresponding to the largest attention weight) on the image.

It will be appreciated that whilst present principals have been described with reference to some example embodiments, these are not intended to be limiting, and that various alternative arrangements may be used to implement the subject matter claimed herein.

What is claimed is:

1. An apparatus, comprising:
   at least one processor
   programmed with instructions executable by the at least one processor to:
   receive an image;
   process the image using a first neural network (FNN) to generate feature maps;
   process at least a first feature map of the feature maps using a second neural network (SNN) to generate at least one attention vector representing at least one characteristic of the image;
   combine the attention vector with the first feature map to render an output feature vector useful for rendering a final feature vector to generate a natural language caption for the image.

2. The apparatus of claim 1, comprising at least one output device to present the caption in human-perceptible form.

3. The apparatus of claim 1, wherein the image is an image from a video game.

4. The apparatus of claim 1, wherein the SNN comprises a multilayer perceptron (MLP).

5. The apparatus of claim 1, wherein the instructions are executable to combine the attention vector with the first feature map by executing a weighted sum over feature vectors in the first feature map with the attention vector to render the output feature vector.

6. The apparatus of claim 1, wherein the instructions are executable to combine the output feature vector with a pooled feature vector by executing an elementwise addition of the output feature vector with the pooled feature vector.

7. The apparatus of claim 1, wherein the instructions are executable to combine the output feature vector with a pooled feature vector by concatenating the output feature vector with the pooled feature vector.

8. An apparatus, comprising:
   at least one processor programmed with instructions to:
   process an image using a feature generation module comprising at least one neural network (NN) to output feature information; and
   use the bottom-up feature information to generate a natural language caption describing the image, wherein the feature generation module comprises at least one network combining information from an attention vector with information derived from the feature information.

9. The apparatus of claim 8, wherein the feature generation module comprises at least one residual top-down network combining information from an attention vector with information from an average pooling vector derived from a source of feature vectors.

10. The apparatus of claim 8, wherein a caption generation module is associated with the feature generation module and comprises at least one residual top-down network, and the instructions are executable to use the top-down network to combine information from an attention vector with information from an average pooling vector derived from feature vectors associated with the feature information.

11. The apparatus of claim 9, wherein the NN comprises a convolutional neural network (CNN) and the feature generation module comprises:
 a neural network (NN) executable to process at least a first feature map from the CNN to generate at least one attention vector representing at least one characteristic of the image;
 the instructions being executable to combine the attention vector with the first feature map to render an output feature vector and to combine the output feature vector with a pooled feature vector derived from the first feature map to render a final feature vector for input thereof to the caption generation module.

12. The apparatus of claim 11, wherein the NN comprises a multilayer perceptron (MLP).

13. The apparatus of claim 10, wherein the caption generation module comprises:
 a first NN executable to process feature vectors from the feature generation module;
 a second NN executable to output a context vector;
 a third NN executable to receive output by the first and second NNs to produce an output that is combined with an output of the first NN to render an input for combination with one or more vectors to render a result.

14. The apparatus of claim 13, wherein the instructions are executable to use an attention vector to pool the feature vectors attentionally to produce an attentionally-pooled feature vector.

15. The apparatus of claim 14, wherein the instructions are executable to combine the attentionally-pooled feature vector with the average pooling vector for input to a neural network producing natural language words from input.

16. The apparatus of claim 15, wherein the neural network producing natural language words from input comprises a long short-term memory (LSTM) module.

17. An apparatus, comprising:
 at least one computer storage that is not a transitory signal and that comprises instructions executable by at least one processor to:
 process feature vectors representing characteristics of an image using a first neural network (NN);
 process a context vector output by a second NN using a third NN;
 combine an output of the first NN with an output of the third NN to render an input;
 process the input using a fourth NN to render an attention vector;
 combine the attention vector with the context vector to render a combined vector;
 combine the combined vector with a pooled vector derived from the feature vectors to render a final feature vector; and
 process the final feature vector to generate at least one word describing the image.

18. The apparatus of claim 17, wherein the act of process the final feature vector is executed at least in part using a long short-term memory (LSTM) neural network.

19. The apparatus of claim 17, wherein the second NN is configured to output the context vector based on input comprising two or more inputs selected from:
 word embedding predicted by the captioning NN in a previous time step;
 a last hidden state from the captioning NN;
 a mean-pooled feature representation of the image;
 a globally mean-pooled bottom-up region feature from among a set of region feature vectors.

20. An apparatus, comprising:
 at least processor configured with instructions executable by the processor to:
 process feature vectors using a first neural network (NN);
 output attention information;
 use the attention information for predicting a word of a caption of an image represented by the feature vectors.

* * * * *